(12) United States Patent
Steinberg et al.

(10) Patent No.: US 10,202,999 B2
(45) Date of Patent: Feb. 12, 2019

(54) METHOD FOR FIXING AN EXPANSION ANCHOR TO A SUBSTRATE, IN WHICH A CURABLE MASS IS INTRODUCED IN THE ANNULAR SPACE AROUND THE EXPANSION ANCHOR

(71) Applicant: Hilti Aktiengesellschaft, Schaan (LI)

(72) Inventors: Tanja Steinberg, Buchs (CH);
 Giuseppe Guida, Buchs (CH); Kathrin Sproewitz-Haefliger, Buchs (CH);
 Marc Schaeffer, Altendorf (CH)

(73) Assignee: Hilti Aktiengesellschaft, Schaan (LI)

(*) Notice: Subject to any disclaimer, the term of this patent is extended or adjusted under 35 U.S.C. 154(b) by 0 days.

(21) Appl. No.: 15/770,025

(22) PCT Filed: Oct. 19, 2016

(86) PCT No.: PCT/EP2016/075005
§ 371 (c)(1),
(2) Date: Apr. 20, 2018

(87) PCT Pub. No.: WO2017/067945
PCT Pub. Date: Apr. 27, 2017

(65) Prior Publication Data
US 2018/0313384 A1   Nov. 1, 2018

(30) Foreign Application Priority Data
Oct. 23, 2015 (EP) .................... 15191165

(51) Int. Cl.
*F16B 13/04* (2006.01)
*F16B 13/14* (2006.01)
(Continued)

(52) U.S. Cl.
CPC .............. *F16B 13/141* (2013.01); *E04B 1/40* (2013.01); *F16B 13/065* (2013.01)

(58) Field of Classification Search
CPC .......... E04B 1/40; F16B 13/141; F16B 13/065
See application file for complete search history.

(56) References Cited

U.S. PATENT DOCUMENTS 2,667,037 A  1/1954  Thomas et al.
2,952,129 A  9/1960  Dempsey
(Continued)

FOREIGN PATENT DOCUMENTS

DE  27 45 438 A1   4/1979
DE  197 12 426 A1  10/1998
(Continued)

OTHER PUBLICATIONS

PCT/EP2016/075005, International Search Report (PCT/ISA/220 and PCT/ISA/210) dated Jan. 19, 2017, with partial English translation, enclosing Written Opinion of the International Searching Authority (PCT/ISA/237) (Twelve (12) pages).

*Primary Examiner* — Beth A Stephan
(74) *Attorney, Agent, or Firm* — Crowell & Moring LLP

(57) ABSTRACT

A method for fixing an expansion anchor to a substrate includes introducing an anchoring zone and at least one part of a middle zone of a bolt of the expansion anchor into a hole in the substrate together with an expansion sleeve of the expansion anchor. The bolt is then moved relative to the expansion sleeve in a pull-out direction, as a result of which the expansion anchor is anchored to the wall of the hole. The space between the wall of the hole and the bolt is then filled to the height of at least one part of the middle zone with a curable mass such that the curable mass on the middle zone reaches up to an annular collar of the bolt, where the collar is configured as one piece with the bolt and is locally larger in cross-section, and the curable mass is cured.

8 Claims, 2 Drawing Sheets

(51) Int. Cl.
    *E04B 1/41*     (2006.01)
    *F16B 13/06*     (2006.01)

(56) References Cited

U.S. PATENT DOCUMENTS

| | | |
|---|---|---|
| 3,204,416 A | 9/1965 | Williams |
| 3,326,004 A | 6/1967 | Williams |
| 3,379,019 A | 4/1968 | Williams |
| 3,695,045 A | 10/1972 | Williams |
| 3,702,060 A | 11/1972 | Cumming |
| 4,185,438 A | 1/1980 | Fischer |
| 4,516,883 A | 5/1985 | Zeitler |
| 4,566,344 A | 1/1986 | Chaki |
| 4,601,614 A | 7/1986 | Lane et al. |
| 5,042,961 A | 8/1991 | Scott et al. |
| 5,064,312 A | 11/1991 | Calandra, Jr. et al. |
| 5,636,945 A | 6/1997 | Nes |
| 5,919,006 A | 7/1999 | Calandra, Jr. et al. |
| 6,655,889 B2 | 12/2003 | Ludwig et al. |
| 2008/0075553 A1 | 3/2008 | Gonzalez Carquijero et al. |

FOREIGN PATENT DOCUMENTS

| | | |
|---|---|---|
| DE | 198 18 739 A1 | 10/1999 |
| DE | 100 60 510 A1 | 6/2002 |
| DE | 101 11 470 A1 | 9/2002 |
| DE | 102 04 591 A1 | 8/2003 |
| DE | 102 16 897 A1 | 11/2003 |
| DE | 103 60 156 A1 | 7/2006 |
| DE | 10 2006 000 475 A1 | 4/2008 |
| DE | 10 2011 055 878 A1 | 6/2013 |
| EP | 0 261 887 B1 | 1/1988 |
| EP | 2 886 881 A1 | 6/2015 |
| WO | WO 98/57035 A1 | 12/1998 |
| WO | WO 2011/116918 A2 | 9/2011 |

METHOD FOR FIXING AN EXPANSION ANCHOR TO A SUBSTRATE, IN WHICH A CURABLE MASS IS INTRODUCED IN THE ANNULAR SPACE AROUND THE EXPANSION ANCHOR

This application claims the priority of International Application No. PCT/EP2016/075005, filed Oct. 19, 2016, and European Patent Document No. 15191165.8, filed Oct. 23, 2015, the disclosures of which are expressly incorporated by reference herein.

BACKGROUND AND SUMMARY OF THE INVENTION

The invention relates to a method fixing an expansion anchor to a substrate.

An expansion anchor is, for example, known from EP 2886881 A1. The expansion anchor is used to anchor mounting parts to a hole in a solid substrate, for example a concrete substrate. The known expansion anchor has an elongated bolt, which is provided with an expansion cone in the area of its front end, and which has a thread in the area of its rear end, on which a nut is seated. The expansion cone expands toward the front end, i.e., against the pull-out direction. In the pull-out direction, an expansion sleeve is situated on the bolt offset to the expansion cone. Toward the front end of the bolt on the expansion cone, this expansion sleeve is displaceably mounted on the bolt. The bolt has an annular collar configured as one piece with the bolt which forms an axial stop which delimits the displacement of the expansion sleeve relative to the bolt towards the rear end of the bolt.

When setting the anchor, the first end of the bolt is pounded into the hole in the substrate against the pull-out direction. The expansion sleeve is entrained by the annular collar and therefore also reaches the hole. The nut is then screwed on until it abuts on the substrate or a mounting part, which may be present as an abutment, and it is then tightened further until a predefined torque is reached. This tightening of the nut causes the bolt to be pulled back out of the hole to a certain extent in the pull-out direction. After the expansion anchor is pounded in, the expansion sleeve is caught on the inner hole wall and is therefore retained upon withdrawal of the bolt in the hole. As a result, the expansion cone of the bolt is drawn into the expansion sleeve, the expansion sleeve being expanded due to the increasing diameter of the expansion cone. The expansion anchor is jammed with the expansion sleeve in the substrate, so that tensile loads may be transferred into the substrate. This basic principle may preferably also be used in the method according to the present invention.

DE 10204591 A1 teaches a method for setting an expansion anchor in which mortar is additionally filled into the hole after the expansion anchor has been anchored in the hole. The cured mortar is supposed to support the expansion anchor in the radial direction in the hole. DE 10204591 A1 provides a seal which prevents mortar entering a front region of the expansion anchor and the hole, and the seal can also be a circumferential bead on the anchor bolt. According to DE 10204591 A1, a small amount of mortar passing the seal in the front region of the hole can be tolerated under certain circumstances. In order to allow subsequent expansion of the expansion anchor in the case of expansion of the hole, for example as a result of crack formation in the substrate, a mortar can be selected, according to DE 10204591 A1, which does not fixedly adhere to the expansion anchor and/or the hole.

DE 10360156 A1 discloses an expansion anchor in which depressions are formed in the shell surface of the bolt which allow a mortar mass, which can be introduced into the hole, to penetrate. These depressions may be conically shaped.

Further anchors, in which expansion elements are used in combination with curable masses, are known from the publications DE102006000475 A1, DE10216897 A1, DE10060510 A1, WO9857035 A1, U.S. Pat. No. 5,919,006A, U.S. Pat. No. 5,636,945A, U.S. Pat. No. 5,042,961 A U.S. Pat. No. 5,064,312 A, U.S. Pat. No. 4,601,614 A, U.S. Pat. No. 4,516,883A, U.S. Pat. No. 4,556,344 A, U.S. Pat. No. 3,702,060A, U.S. Pat. No. 3,695,045A, U.S. Pat. No. 3,204,416A, U.S. Pat. No. 3,326,004A, U.S. Pat. No. 2,952,129 A, U.S. Pat. No. 3,379,019 A and U.S. Pat. No. 2,667,037 A.

DE102011055878 A1 describes a method for anchoring an expandable anchor in which the expansion sleeve is adhered in an anchor shaft, whereas the anchor bolt is not adhered to anchor hole.

An injection washer emerges from WO 11116918 A2 which has a central hole, a filling opening and a ventilation opening. This injection washer is used in a method for subsequent strengthen of a fastening means to be inserted into a hole which is already located in its mounted state, for example a heavy-duty anchor with an expandable sleeve. A further washer with a through hole for filling the mortar mass into the hole is known from DE10111470 A1.

DE 19818739 A1 describes a retrospective reinforcement connection, a reinforced bar being provided in the lower region with at least one conical sleeve and is provided in the upper region with a plastic sleeve and the annular gap is filled with curable mass.

EP 0251887 B1 describes an anchor to be cast, in which the bolt is surrounded between its thread section and its front end by a tube made of deformable material which has a lower mechanical strength than that of the once-cured potting resin.

DE 2745438 A1 describes an anchor which has an expanding expansion part which exerts an expansion force on surrounding cured binder segments. DE 19712425 A1 deals with a compound anchor which consists of an anchor rod which has at least one cone section expanded in the insertion direction and can be anchored by means of a compound mass in a hole of a substrate.

The object of the invention is to indicate a method for fixing an expansion anchor which opens up a particularly wide application spectrum for the expansion anchor with particularly little effort and easy implementability and in particular allows particularly good load values.

In accordance with method according to the invention for fixing an expansion anchor on a substrate:

an expansion anchor, which has at least one expansion sleeve and at least one bolt passing through the expansion sleeve, is provided, the bolt having a load application zone for introducing a tensile force into the bolt, a middle zone axially adjacent to the load application zone and an anchoring zone axially adjacent to the middle zone, the expansion sleeve being arranged at the height of the anchoring zone, the bolt having an expansion cone in the anchoring zone which pushes the expansion sleeve radially outwards to anchor the expansion anchor when the expansion cone is moved relative to the expansion sleeve in a pull-out direction and the bolt having an annular collar configured as one piece with the bolt between the middle zone and the anchoring zone, at which the bolt is formed larger in cross-section than in the adjacent middle zone and which forms an axial stop for the expansion sleeve, the anchoring zone and at least one part of the middle zone of the bolt together with the expansion sleeve are inserted into a hole in the substrate against the pull-out direction, the bolt is then moved with the expansion cone relative to the expansion sleeve in the pull-out direction whereby the expansion anchor is anchored to the wall of the hole, the space between the wall of the hole and the bolt is then filled with a curable mass to the height of at least one part of the middle zone such that the curable mass reaches, at the middle zone, up to the annular collar of the bolt and the curable mass located in the space between the wall of the hole and the bolt is cured.

A basic concept of the invention is considered providing a collar configured as one piece with the bolt and protruding radially with respect to the rear middle zone on an expansion anchor of the bolt type axially just before the anchoring zone and filling the annular space around the bolt of the expansion anchor with curable mass following the mechanical anchoring of the expansion anchor such that the collar abuts on the cured mass on its rear side at least in sections, preferably completely, after the curable mass has cured. In experiments, it has been surprisingly shown that such an approach can improve not only the dynamic transverse loadability of the expansion anchor, but surprisingly also the axial pull-out load.

An improvement of the pull-out loads could in particular be observed with such expansion anchors which are anchored in a hole which runs through a crack alternately opening and closing. After repeated crack opening cycles, notably increased residual pull-out forces could be observed here. These notably increased residual pull-out forces were associated with notably reduced anchor displacements and notably deeper concrete failure cones after repeated crack opening cycles. It is expected at present that the improved values should be traced back to a type of additional, positive-locking axial anchoring which results between the collar and the mass abutting on the collar and connected to the hole wall. Since the collar is arranged directly adjacent to the anchoring zone according to the invention, it also forms the axial sleeve stop, the load introduction using this mechanism can take place particularly deep in the hole and thus be carried out effectively. Since the collar is configured as one piece with the bolt, particularly high tensile forces can be transferred to the bolt in a particularly reliable manner.

The filling of the space between the wall of the hole and the bolt can, on the one hand, provide the advantage in the configuration according to the invention that the complete anchor system is notably more rigid whereby higher loads can be achieved in the transverse-pull. In addition, notably higher pull-out values and lower displacement values of the anchor can also be achieved under seismic and dynamic conditions with the particular method process according to the invention, in which an additional positive-locking anchoring is formed on the collar similar to an indentation. As a result of the anchor initially expanding according to the invention and only then being filled, the anchor generally does not act like a classic compound anchor, but rather more like a mechanically anchored anchor with the additional advantages of an increased system rigidity and an additional indentation-like anchoring.

The middle zone of the bolt is located axially between the load application zone of the bolt and the anchoring zone of the bolt. The middle zone, the load application zone and the anchoring zone are in particular axially moved towards one another. Insofar as "radial", "axial" and "circumferential direction" are mentioned in this description, this may in particular relate to the longitudinal axis of the bolt, which can, in particular, be the symmetry and/or middle axis of the bolt. A longitudinal section and/or a cross-section can also relate to this longitudinal axis. Insofar as mention is made here to the fact that an element is located "at the height" of another element, this may also in particular relate to this longitudinal axis, i.e., the height is measured at the longitudinal axis.

In the case of the step, according to the invention, of introducing the anchoring zone and at least one part of the middle zone of the bolt together with the expansion sleeve against the pull-out direction into a hole in the substrate, the entire middle zone and/or at least one part of the load application zone can also be introduced into the hole. The expansion sleeve is arranged, according to the invention, on the bolt, in particular fastened to the bolt, so as to be displaceable along the bolt.

The expansion anchor can, in particular, be a force-controlled expanding expansion anchor. The expansion sleeve and/or the bolt suitably consist of a metal material which can, for example, also be coated to specifically influence the friction. The substrate may in particular be a mineral construction material, preferably concrete. The curable mass can, for example, be a mortar or a synthetic resin. Depending on the composition of the mass, the curing of the mass can, for example, occur simply with the passage of time. Alternatively, curing by way of a supply of energy, in particular heat supply can for example be provided.

The expansion cone is preferably drawn into the expansion sleeve, when anchoring the expansion anchor, by way of a common axial movement of the bolt together with its expansion cone relative to the expansion sleeve. The expansion cone is suitably arranged, at least in the axial direction, fixed on the bolt. The expansion cone is preferably configured as one piece with the bolt. The expansion anchor according to the invention can preferably also be designated as an anchor of the bolt type.

The expansion sleeve is expediently pushed radially outwards from an inclined surface of the expansion cone and is pressed against the hole wall in the substrate when the expansion cone is moved axially relative to the expansion sleeve in the pull-out direction of the bolt. The expansion anchor is hereby anchored in the hole. The pull-out direction preferably runs parallel to the longitudinal axis of the bolt and/or shows from the hole in the substrate. The distance of the surface of the expansion cone from the longitudinal axis of the bolt expediently increases against the pull-out direction, i.e., with increasing distance from the load application zone. The surface of the expansion cone can be strictly conical. However, in accordance with the technical definition of an expansion cone, it does not have to be. For example, the surface of the expansion cone can also be convex or concave in the longitudinal section.

The curable mass is, according to the invention, only anchored after the mechanical anchoring, i.e., introduced into the space between bolt and wall after the expansion cone is drawn into the expansion sleeve and the expansion sleeve expands radially in order to prevent any undesired interaction of the curable mass with the mechanical anchoring mechanism. Following the curing of the curable mass, subsequent expansion of the sleeve can, however, be provided by the expansion cone and thus subsequent anchoring.

The collar forms a rear axial stop for the expansion sleeve which delimits a displacement of the expansion sleeve away from the expansion cone, i.e., a displacement of the expansion sleeve in the pull-out direction. The collar preferably has an annular or at least unbroken annular stop surface for the expansion sleeve, and the stop surface can run preferably perpendicular to the longitudinal axis of the bolt. The collar preferably forms an at least local cross-section maximum on the bolt, the axial stop on which the expansion sleeve strikes, is formed on the front side of the collar. The collar can also essentially comprise radial recesses. Preferably however, it comprises the form of a closed ring.

It is particularly preferred for a retaining ring made of curable mass to be formed between the wall of the hole and the bolt when filling the space, the mass abuts on the collar at the side of the collar facing the middle zone and which surrounds the bolt and it is also particularly preferred for the retaining ring to be cured. According to this embodiment, the entire collar abuts on the cured mass such that the hold values and the reliability can increase even further.

At least one part of the anchoring zone is also left free of curable mass. The space between the wall of the hole and the bolt is accordingly filled only partially with curable mass. Undesired interactions between the curable mass and the expansion mechanism are hereby avoided and the reliability can be increased even further. For example, the collar integrated on the bolt can form a seal which impedes a flow of the curable mass towards the anchoring zone.

It is also expedient for a curable mass to be used which adheres more strongly to the wall of the hole than to the bolt after curing. A curable mass can, in particular, be used which adheres to the wall of the hole, not, however, to the bolt after curing. According to this configuration, the cured curable mass, on the one hand, can serve as a positive-locking anchor for the collar on the substrate, on the other hand, the remaining bolt can be moved axially in the cured mass such that the mechanical expansion mechanism continues to remain operative. The reliability can be hereby increased even further. The cured mass can, in particular, have a fixed connection to the wall of the hole, however, can come loose from the bolt in the case of a crack opening.

The bolt can be designed thread-free in the middle zone, in particular substantially cylindrically. The above-described positive-locking anchor effect can be concentrated even better on the collar which may be advantageous in terms of the load values. For this reason, the bolt can, additionally or alternatively, be designed on the annular collar larger in cross-section than in the load application zone.

The bolt can have an outer thread in the load application zone. Alternatively or additionally the bolt can, however, also have an inner thread and/or a head.

A further preferred configuration of the invention is that an injection washer is provided which annularly surrounds the bolt and which has at least one channel and in that the space between the wall of the hole and the bolt is filled with curable mass through the channel of the injection washer. A particularly simple and also reliable filling is hereby achieved. The injection washer can, for example, be designed as described in DE 10111470 A1. The space between the wall of the hole and the bolt is expediently filled from the rear side of the bolt, i.e., from its load application zone and/or thread side, preferably by means of an injection washer.

The invention also relates to a fastening arrangement consisting of an expansion anchor and a substrate, the expansion anchor being fixed to the substrate by means of a method according to the invention. Features, which are explained in connection with the method according to the invention, can also be used with the fastening arrangement according to the invention, and vice versa, features, which are explained in connection with the fastening arrangement, can also be used with the method according to the invention.

The invention is explained in further detail below based on preferred exemplary embodiments, which are schematically represented in the enclosed Figures, and individual features of the exemplary embodiments shown below can essentially be implemented in the context of the invention individually or in combination.

BRIEF DESCRIPTION OF THE DRAWINGS

FIG. 1 shows the anchor used in a side view and FIGS. 2 to 4 show the anchor used in a longitudinal sectional view and the outer thread merely being roughly schematically shown in FIGS. 2 to 4.

DETAILED DESCRIPTION OF THE DRAWINGS

FIGS. 1 to 4 show consecutive stages when carrying out an exemplary embodiment of a setting method according to the invention.

Figure 1:
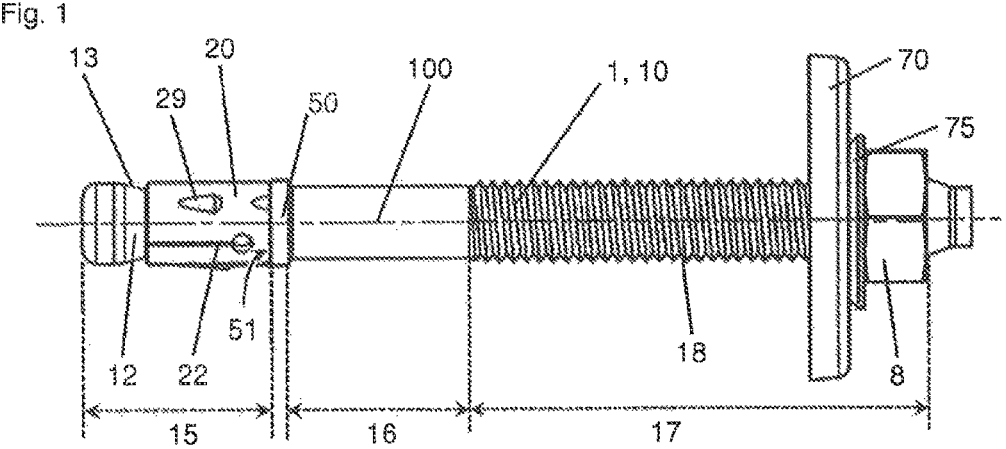
FIGS. 1 to 4 illustrate consecutive method stages when carrying out a method according to the invention where

Firstly, as shown in FIG. 1, an expansion anchor 1 is provided. This expansion anchor 1 has a bolt 10 and an expansion sleeve 20, the expansion sleeve 20 annularly surrounding the bolt 10.

The bolt 10 has three zones spaced apart in the axial direction: in the front end region of the bolt 10, an anchoring zone 15, in the rear end region of the bolt 10, a load application zone 17 and axially between the anchoring zone 15 and the load application zone 17, a middle zone 16. The anchoring zone 15, the middle zone 16 and the load application zone 17 are arranged coaxial to one another. The bolt 10 has an expansion cone 12 for the expansion sleeve 20 in the anchoring zone 15. The expansion cone 12 is fixedly arranged on the bolt 10 and preferably configured as one piece with the bolt 10. The surface of the bolt 10 is designed as an inclined surface 13 on the expansion cone 12 and the diameter of the bolt 10 increases there towards the front end of the bolt 10, i.e., the bolt 10 expands on the expansion cone towards its front end. The inclined surface 13 on the expansion cone 12 can be conical in the strictly mathematical sense, but does not have to be.

The expansion sleeve 20 can have axially running slots 22 which facilitate the expansion of the expansion sleeve 20. The expansion sleeve 20 can also have outer projections 29 for improved anchoring on the wall 98 of the hole 99.

The load application zone 17 serves to introduce tensile forces directed in the pull-out direction 101 into the bolt 10. In the exemplary embodiment represented, the load application zone 17 is characterised by the bolt having an outer thread 18 there. A nut 8 is seated on this outer thread 13 of the bolt 10, the nut has an inner thread corresponding to the outer thread 18.

The bolt 10 is designed substantially cylindrical in the middle zone 16 of the bolt 10. The bolt 10 has an annular collar 50 between the middle zone 16 and the anchoring zone 15. This collar 50 is configured as one piece with the bolt 10, arranged coaxially to the middle zone 16 and the anchoring zone 15 and is both larger in cross-section than the middle zone 16 and also larger in cross-section than the anchoring zone 15, at least larger in cross-section than the rear region of the anchoring zone 15 connected to the collar 50. The collar 50 thus forms an at least local cross-sectional maximum and an axial stop 51 which impedes and delimits an axial movement of the expansion sleeve 20 relative to the bolt 10 in the pull-out direction 101. The collar 50 can also be larger in cross-section than the load application zone 17.

Lastly, the anchor provided has an injection washer 70 which annularly surrounds the bolt 10. A channel 72 is formed in this injection washer 70 which serves to introduce a curable mass 77 which is explained further below. A spherical disc 75 can, for example, also be provided between the nut 8 and the injection washer 70 in order to ensure even pressing of the injection washer 70 even in non-orthogonal arrangements.

Figure 2:
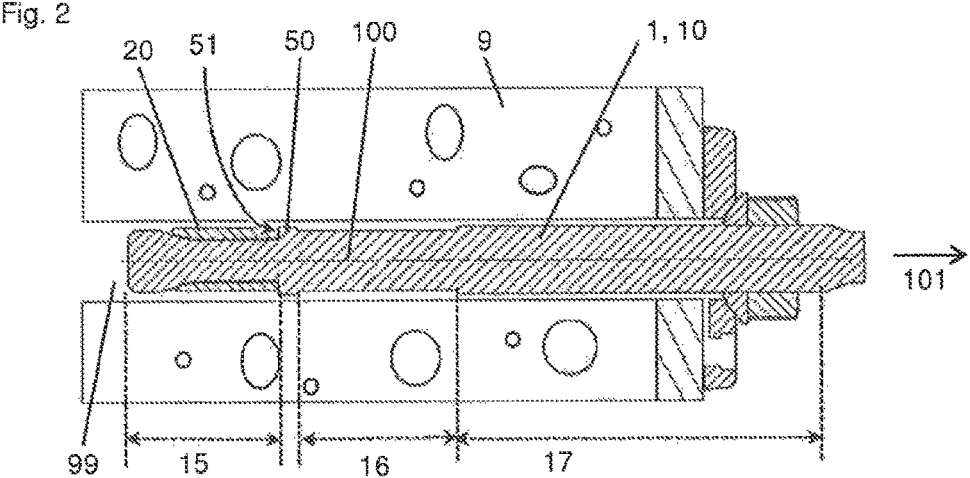

In the next method step, whose result is shown in FIG. 2, the bolt 10 is pushed into a hole 99 in a substrate 9 with its front end first through a mounting part 6 parallel to the longitudinal axis 100 of the bolt 10 and against the pull-out direction 101 of the bolt 10. Owing to the axial stop 51 formed on the collar 50, which delimits a displacement of the expansion sleeve 20 away from the expansion cone 12, the expansion sleeve 20 is also introduced into the hole 99.

Figure 3:
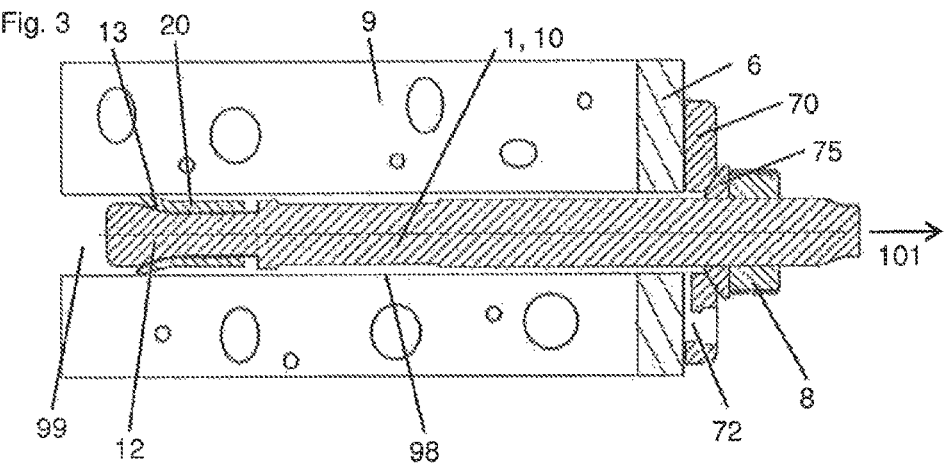

In the following method step, whose result is shown in FIG. 3, the bolt 10 is pulled back out of the hole 99 to a certain extent in the pull-out direction 101 running parallel to the longitudinal axis 100 of the bolt 10 by tightening the nut 8 abutting directly on the substrate 9 via the optionally spherical disc 75, the injection washer 70 and the mounting part 6. Owing to its friction on the substantially cylindrical wall 98 of the hole 99, the expansion sleeve 20 remains in the hole 99 and as a result there is a displacement of the bolt 10 relative to the expansion sleeve 20. In the case of this displacement, the inclined surface 13 of the expansion cone 12 of the bolt 10 penetrates even deeper into the expansion sleeve 20 such that the expansion sleeve 20 expands radially in the region of its front end from the inclined surface 13 and is pressed on the wall 98 of the hole 99. The expansion anchor 1 is fixed in the substrate 9 by this mechanism.

Figure 4:
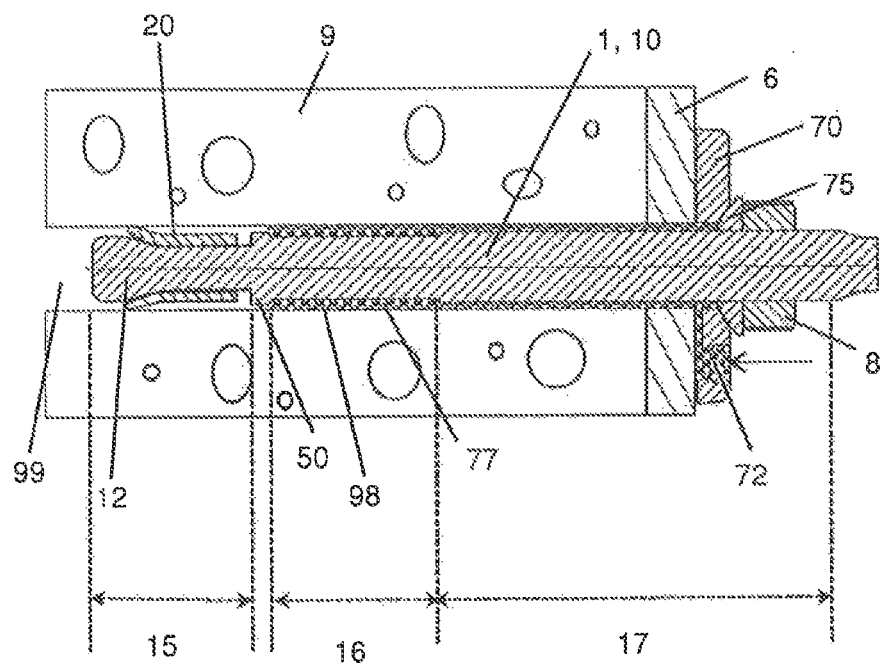

In the following method step, whose result is shown in FIG. 4, a curable mass 77, indicated in FIG. 4 with an arrow, is injected through the channel 72 in the injection washer 70 into the space between the wall 98 of the hole 99 and the bolt 10. The curable mass 77 flows in the space between the wall 98 of the hole 99 and the bolt 10 forming an annular space along the load application zone 17 and the middle zone 16, or depending on the anchoring depth, even only along the middle zone 16 in the direction towards the anchoring zone 15. According to the invention, in terms of quantity, as much curable mass 77 is injected into the space between the wall 98 of the hole 99 and the bolt 10 such that the curable mass 77 reaches up to the annular collar 50 on the bolt 10. The annular collar 50 can serve as a seal which at least impedes further flowing of the curable mass 77 into the anchoring zone 15. The intended filling can be discerned by curable mass 77 escaping at the hole opening. As much curable mass 77 is preferably introduced into the space between the wall 98 of the hole 99 and the bolt 10 such that the curable mass 77 forms a retaining ring arranged concentric to the longitudinal axis 100 of the bolt 10 and continuously abutting on the collar 50.

Following the introduction of the curable mass 77 into the space between the wall 98 of the hole 99 and the bolt 10, the curable mass 77 is cured in the space between the wall 98 of the hole 99 and the bolt 10 which may occur with a curable mass 77 based on a two-component resin, for example by waiting for the curing time.

The invention claimed is:
1. A method for fixing an expansion anchor to a substrate, wherein the expansion anchor comprises:
an expansion sleeve and a bolt which passes through the expansion sleeve, wherein the bolt has a load application zone for introducing a tensile force into the bolt, a middle zone axially adjacent to the load application zone, and an anchoring zone axially adjacent to the middle zone, wherein the expansion sleeve is disposed at a height of the anchoring zone, wherein the bolt has an expansion cone in the anchoring zone which pushes the expansion sleeve radially outwards to anchor the expansion anchor when the expansion cone is moved relative to the expansion sleeve in a pull-out direction, wherein the bolt has an annular collar configured as one piece with the bolt between the middle zone and the anchoring zone, wherein at the annular collar the bolt is larger in cross-section than in the adjacent middle zone, and wherein the annular collar forms an axial stop for the expansion sleeve;
and comprising the steps of:
inserting the anchoring zone and at least one part of the middle zone of the bolt together with the expansion sleeve into a hole in the substrate against the pull-out direction;
after the inserting, moving the bolt with the expansion cone relative to the expansion sleeve in the pull-out direction such that the expansion anchor is anchored to a wall of the hole;
after the moving, filling a space between the wall of the hole and the bolt with a curable mass such that the curable mass reaches up to the annular collar of the bolt; and
curing the curable mass disposed in the space between the wall of the hole and the bolt.
2. The method according to claim 1, wherein a retaining ring made of the curable mass is formed when filling the space between the wall of the hole and the bolt, wherein the retaining ring abuts on the collar on a side of the collar facing the middle zone and surrounds the bolt, and wherein the retaining ring is cured.
3. The method according to claim 1, wherein at least one part of the anchoring zone is free of the curable mass.
4. The method according to claim 1, wherein the curable mass, after the curing, adheres to the wall of the hole more strongly than to the bolt.
5. The method according to claim 1, wherein the bolt is substantially cylindrical in the middle zone.
6. The method according to claim 1, wherein the bolt has an outer thread in the load application zone.
7. The method according to claim 1, wherein the expansion anchor further comprises an injection washer which annularly surrounds the bolt and has a channel, wherein the space between the wall of the hole and the bolt is filled with the curable mass through the channel of the injection washer.
8. A fastening arrangement, comprising:
an expansion anchor, wherein the expansion anchor includes an expansion sleeve and a bolt which passes through the expansion sleeve, wherein the bolt has a load application zone for introducing a tensile force into the bolt, a middle zone axially adjacent to the load application zone, and an anchoring zone axially adjacent to the middle zone, wherein the expansion sleeve is disposed at a height of the anchoring zone, wherein the bolt has an expansion cone in the anchoring zone which pushes the expansion sleeve radially outwards to anchor the expansion anchor when the expansion cone is moved relative to the expansion sleeve in a pull-out direction, wherein the bolt has an annular collar configured as one piece with the bolt between the middle zone and the anchoring zone, wherein at the annular collar the bolt is larger in cross-section than in the adjacent middle zone, and wherein the annular collar forms an axial stop for the expansion sleeve;

wherein the expansion anchor is fixable to a substrate by the method according to claim 1.

* * * * *